United States Patent [19]
Alonzo, Jr. et al.

[11] Patent Number: 5,938,322

[45] Date of Patent: Aug. 17, 1999

[54] REAR-VIEW MIRROR WITH FORWARD FACING WARNING LIGHT

[75] Inventors: Alexander A. Alonzo, Jr., Deep River; Robert B. Ford, Cromwell, both of Conn.; Harold W. Lyons, Edgewater, Fla.

[73] Assignee: Whelen Engineering Company, Inc., Chester, Conn.

[21] Appl. No.: 09/136,539

[22] Filed: Aug. 19, 1998

[51] Int. Cl.[6] .............................. Q60B 1/02; Q60B 1/26
[52] U.S. Cl. ...................... 362/494; 362/540; 362/546
[58] Field of Search .................................. 362/494, 503, 362/540, 546, 549; 340/468; 359/838, 871

[56] References Cited

U.S. PATENT DOCUMENTS

| | | |
|---|---|---|
| 1,602,094 | 10/1926 | Badding . |
| 1,874,027 | 8/1932 | Condon . |
| 2,010,138 | 8/1935 | Condon . |
| 4,620,268 | 10/1986 | Ferenc . |
| 4,866,329 | 9/1989 | Ferenc . |
| 5,016,996 | 5/1991 | Ueno . |
| 5,017,903 | 5/1991 | Krippelz, Sr. . |
| 5,212,468 | 5/1993 | Adell . |
| 5,253,115 | 10/1993 | Ueno . |
| 5,325,274 | 6/1994 | Mays ........................................ 362/494 |
| 5,477,391 | 12/1995 | Boddy . |
| 5,499,169 | 3/1996 | Chen . |
| 5,660,457 | 8/1997 | Lyons ..................................... 362/494 |

Primary Examiner—Y. Quach
Attorney, Agent, or Firm—Alix, Yale & Ristas, LLP

[57] ABSTRACT

A housing for a wide angle warning light which is to be integrated with a vehicle exterior mounted rear-view mirror is defined by building up a model on the mirror and using the model to produce a mold which is subsequently utilized to form the housing. The housing is, during the integration procedure, adhesively bonded to the mirror and the light head of the warning light is then mounted on the housing.

6 Claims, 2 Drawing Sheets

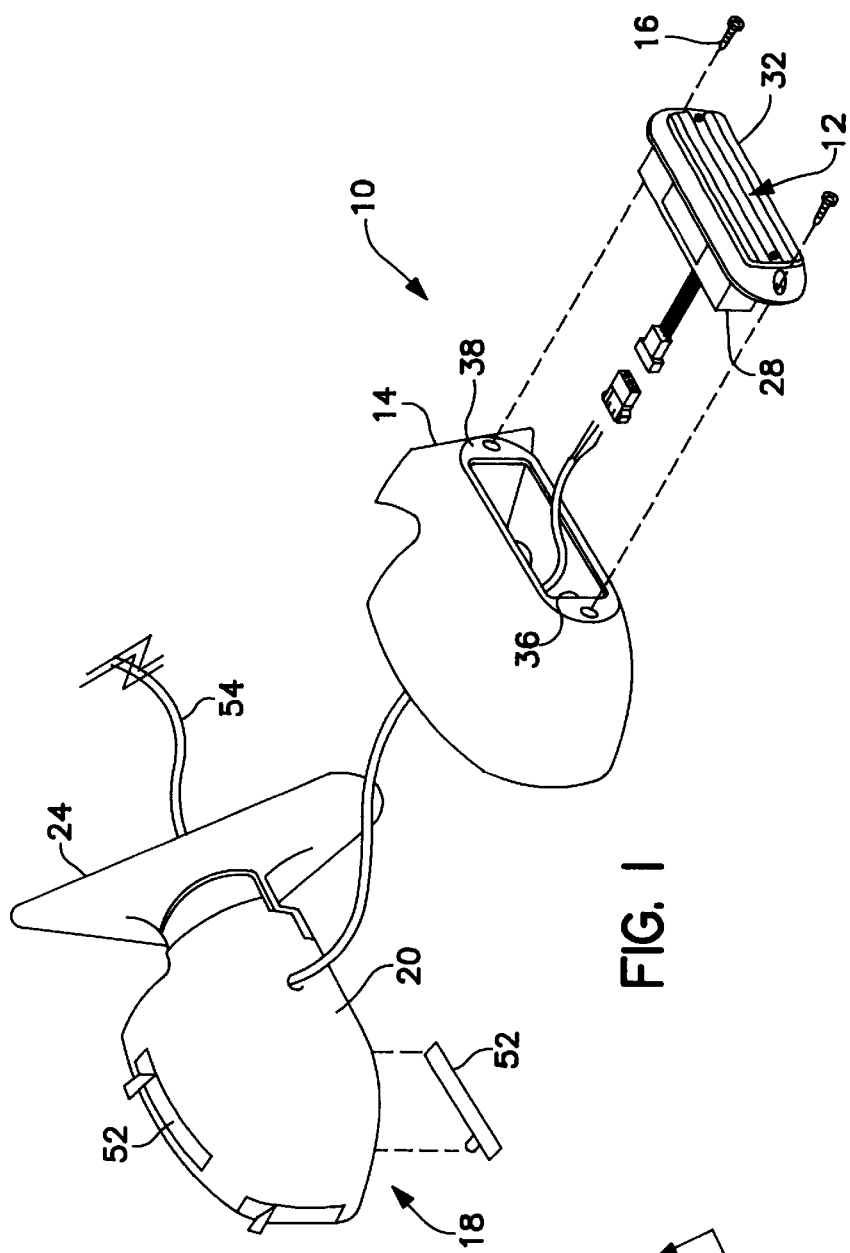
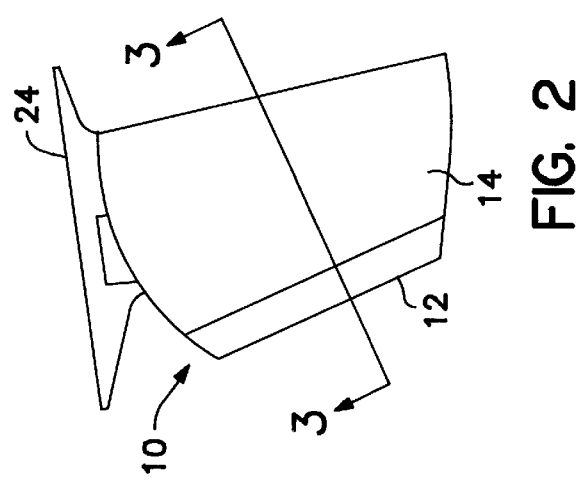

REAR-VIEW MIRROR WITH FORWARD FACING WARNING LIGHT

BACKGROUND OF THE INVENTION

1. Field of the Invention

The present invention relates to warning light systems and, particularly, to the integration of wide-angle warning lights with rear-view mirrors. More specifically, this invention is directed to improvements in the structure and assembly technique of combined externally mounted rear-view mirrors and forward facing strobe lights. Accordingly, the general objects of the present invention are to provide novel and improved apparatus and methods of such character.

2. Description of the Prior Art

Lighting systems for mounting on the exterior of police and other public safety vehicles have long been known in the art. The most popular form of exterior lighting for emergency vehicles is the light bar. A typical light bar assembly, as exemplified by the disclosure of U.S. Pat. No. 4,620,268, has a plurality of lights arranged on a support which spans the roof of a vehicle. Light bars are desirable because of their ability to provide a wide variety of highly visible light radiation patterns. However, the relatively large size of a light bar and its location on the roof of an official vehicle increases wind resistance, often increases vehicle height and makes the vehicle easier to identify from a distance. In circumstances where it is necessary or desirable for an official vehicle to be inconspicuous, the use of a conventional roof-mounted light bar is particularly undesirable.

Warning lights employed on public safety vehicles, when energized, must produce a highly visible display. As discussed herein, a highly visible display is one which produces a high intensity illumination pattern and, particularly, a wide angle divergent light pattern which will minimize the possibility of a collision at an intersection.

Warning lights used on "unmarked" police cars have previously taken a variety of forms. These lights have included rotating beacons and strobe lights which will typically be transported, and often mounted, within the interior of the vehicle, lights mounted behind the front grille of a vehicle and headlight/taillight assemblies which may include flashers and/or high intensity light sources which can be intermittently energized. While these prior art types of relatively inconspicuous lights have all found acceptance in the law enforcement community, the users thereof have expressed a desire for enhanced visibility at large angles relative to the direction of vehicle travel. Thus, there has existed a need for an emergency vehicle light configuration which is both (1) relatively inconspicuous when the lights are not illuminated; and (2) highly conspicuous after the lights have been illuminated, particularly when viewed from the side of the vehicle on which installed.

The above-discussed need has been satisfied by integration of a forward facing, wide angle, strobe light with the externally mounted rear-view mirrors found on most vehicles. Such an integrated warning light and rear-view mirror is described in U.S. Pat. No. 5,660,457.

The warning light system of above-referenced U.S. Pat. No. 5,660,457 has been very successful. The combined warning light subassembly and mirror disclosed in the Patent, however, suffers from the disadvantage of requiring a different mechanical fastening arrangement for each model vehicle. For aesthetic reasons, automobile manufacturers frequently change the size and shape of externally mounted mirrors and the need to make similarly frequent changes in the mechanics of the warning light subassembly presents a significant economic disadvantage. Also, the system disclosed in U.S. Pat. No. 5,660,457 contemplates that the housing of the external mirrors supplied with a vehicle will include a removable trim piece, at the forwardly facing side, and the warning light subassembly will replace this trim piece. The rear-view mirrors of many current production vehicles, however, have a unitary molded mirror housing which would require significant modification in order to permit use of the integration technique described in the Patent.

SUMMARY OF THE INVENTION

The present invention relates to novel and improved warning light assemblies for external mounting on a vehicle and, particularly, to improvements in the apparatus and manufacturing technique described in U.S. Pat. No. 5,660,457. In accordance with the invention, a warning light subassembly, including a light head having a wide angle radiation pattern, is configured for mating with a rear-view mirror assembly of the type which is mounted on the exterior of the side of a vehicle. In the practice of the present invention, the wide angle warning light subassembly is integrated with the rear-view mirror assembly by adhesive bonding. When warning light subassemblies in accordance with the invention are so integrated with the vehicle exterior mirrors, the emitted light will be in the form of forwardly projected, diverging, pulsed beams and use of the mirrors contained within the existing rear-view mirror assemblies is uninhibited. Thus, in the typical installation, a pair of warning lights in accordance with the invention will be mated with the external rear-view mirrors on both sides of the vehicle.

A warning light subassembly in accordance with the invention includes a hollow housing contoured so as to define an aerodynamically shaped projection which extends forwardly from the periphery of the rim which defines the viewing opening at the rearwardly facing end of a vehicle side-mounted mirror. This warning light housing envelopes substantially the entire housing of the mirror assembly. The interior of the housing of the warning light subassembly is adhesively bonded to the exterior of the mirror assembly housing. The housing of the warning light subassembly is a unitary plastic part which smoothly decreases in cross-sectional area from the rearwardly disposed end to a forward end and, at the forward end, receives and supports a light head.

BRIEF DESCRIPTION OF THE DRAWINGS

The present invention may be better understood, and its numerous objects and advantages will become apparent to those skilled in the art, by reference to the accompanying drawings wherein like numerals represent like elements in the several figures and in which:

FIG. 1 is an exploded perspective view of an integrated warning light/mirror assembly in accordance with the present invention;

FIG. 2 is a top view of the assembly of FIG. 1; and

DETAILED DESCRIPTION OF THE PREFERRED EMBODIMENT

Figure 3:
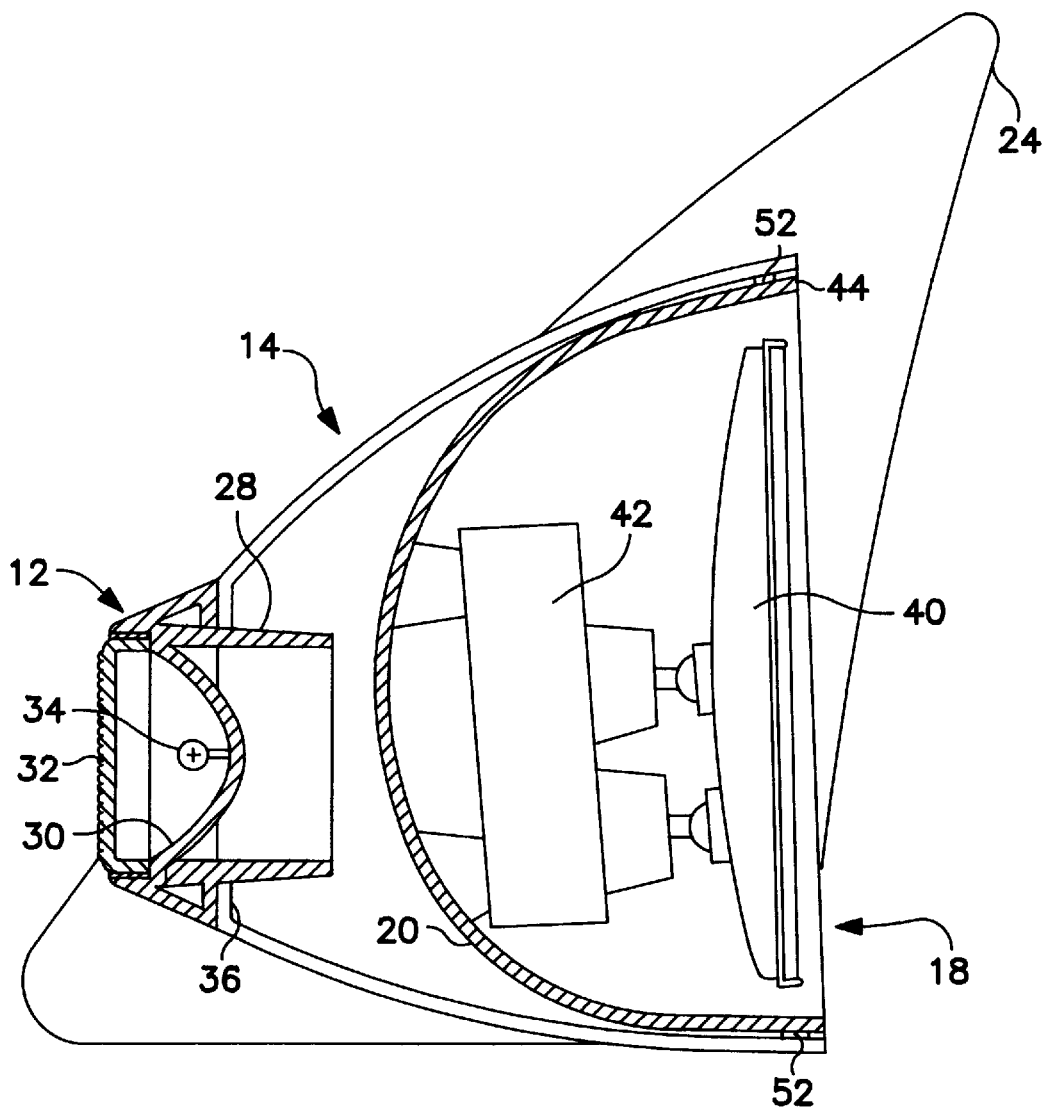
FIG. 3 is an enlarged cross-sectional view, taken along line 3—3 of FIG. 2, of the assembly of FIGS. 1 and 2 with electrical cables and components and seals omitted to facilitate understanding of the invention.

In FIGS. 1 and 2, a warning light subassembly in accordance with a preferred embodiment of the present invention is indicated generally at 10. Subassembly 10 comprises a light head 12 and an associated housing 14. Light head 12 may, for example, comprise a hermetically sealed, miniaturized version of the wide angle strobe light disclosed in U.S. Pat. No. 4,866,329. Head 12 is, in the disclosed embodiment, affixed to the front side of housing 14 by means of mounting screws 16. Housing 14 is a generally cup-like vacuum, i.e., thermal, formed plastic member which is contoured to define an aerodynamically configured forward extension of a rear-view mirror assembly which is indicated generally at 18. Preferably, housing 14 has a texture and color which is generally consistent with that of the housing 20 of rear-view mirror assembly 18. Mirror assembly 18 will customarily be fixedly mounted on a vehicle via a mounting arm, not shown, which extends through a trim piece 24.

Referring to FIG. 3, light head 12 includes a housing 28, a reflector 30, a lens 32 and a light source 34. As shown in FIGS. 1 and 3, the light head 12 extends into the interior of housing 14 through an opening 36. Light source 34 is a light emitter capable of generating pulses of high intensity light, preferably a linear flash tube. It will be understood by those skilled in the art that the light radiation pattern produced by head 12 will be a function of the light emitter and the optical properties of reflector 30 and lens 32.

FIG. 3 also schematically shows details of the rear-view mirror assembly 18. In addition to housing 20, rear-view mirror assembly 18 has a mirror 40 which is supported from adjusting mechanism 42 which, in turn, is fixedly supported within housing 20.

The housing 14 of a warning light subassembly in accordance with the invention is open at the rearwardly disposed end thereof, i.e., the end which engages housing 20 of rear-view mirror assembly 18. As noted above, housing 14 is also provided, at the opposite or forwardly disposed end thereof, with opening 36 which is sized and shaped to receive light head 12. As may be seen from FIG. 1, housing 14 is provided, about the periphery of opening 36, with a forwardly facing mounting surface 38 which engages a complementary surface of light head 12. Housing 14 smoothly increases in cross-sectional size, from the outer periphery of surface 38, to the opposite open end which fits over the housing 20 of the rear-view mirror assembly 18.

As will be explained in more detail below, a family of molds will be prepared for use in manufacturing housing 14. The size and shape of the cavities of these molds is determined by the shape of the mirror assembly housings 20. When the warning light subassembly and mirror assembly are joined, as depicted in FIG. 3, the rearwardly disposed edge of housing 14 will effectively form an extension of the rim 44 of housing 20 which defines the open rearwardly disposed end of the mirror assembly housing.

In accordance with the present invention, when the warning light subassembly and rear view mirror assembly are integrated, the two units become permanently joined. Such permanent joining is accomplished through the use of a plurality of strips of high bond, double-faced, foam tape. This tape is indicated at 52 in FIGS. 1 and 3.

In the practice of the invention, the first time the integration procedure is to be performed for a given vehicle and model, the mirror assembly is employed to make a mold. This is accomplished by building a clay form over the mirror assembly to define an aerodynamically shaped "bridge" between the outer edge of the rearwardly facing rim 44 of mirror housing 20 and a light head oriented such that the light beam produced thereby will be properly aimed. Once the correct warning light subassembly housing shape has been established by this "buildout" on the mirror assembly, a plaster impression of this shape is taken.

Molten aluminum is then poured into this plaster impression to thereby produce a mold which will be used to form housing 14 from heated sheets of plastic.

Presuming that a mold already exists and warning light subassembly housing 14 has been produced, the integration procedure in accordance with the invention requires, as a first step, the removal of the door panel from the vehicle. This allows access to the retention means for the mirror housing and the harness cable of the adjusting mechanism 42. The mirror harness cable is unplugged from the door power harness and the mirror assembly is then removed from the vehicle. Small holes are made to permit the warning light power supply cable, indicated at 54 in FIG. 1, to be extended into the mirror housing and out through the front of mirror housing 20. Next, the exterior of the mirror housing 20 and the interior of the warning light subassembly housing 14 are cleaned and dried. The strips of tape 52 are then applied to the exterior of mirror assembly housing 20. The backing strips on the opposite, i.e., the exposed, sides of tape 52 are folded back slightly as depicted in FIG. 1. The mirror assembly is then placed, with the mirror facing downwardly, on a flat support surface. The housing 14 of the warning light subassembly is then lowered onto the mirror assembly until the rearwardly facing edge of housing 14 also is in contact with the support surface. Housing 14 is then pressed against housing 20 to form a bond in the areas where the backing strip has been peeled from the double-faced tape 52. Next, using a thin blade, the housing 14 is slightly distorted to permit access to the folded-over portions of the backing strips and the backing strips are pulled away from the tape one by one. Finally, pressure is applied to housing 14 in the areas of tape 52 and maintained for a sufficient period of time to allow the adhesive to properly set.

When warning light subassembly housing 14 has been bonded to mirror housing 20, the electrical connection of cable 54 to light head 12 may be accomplished and the light head then affixed to housing 14 by screws 16. Finally, the integrated warning light subassembly and mirror assembly will be mounted on the vehicle door by performing the steps used to remove the mirror assembly from the door in the reverse order. When the combined mirror and warning light is remounted, the functioning of the mirror assembly will not be altered and the integrated warning light will not interfere with the ability of the mirror to fold backwardly upon impact with an object.

A combined warning light rear-view mirror assembly in accordance with the invention will typically be mounted on each side of a vehicle such that the light heads 12 generally face toward the front of the vehicle and the rear-view mirrors 40 generally face toward the rear of the vehicle.

While a preferred embodiment has been illustrated and described, modifications and changes thereto are within the capabilities of those of ordinary skill in the art. The appended claims are intended to cover any and all of such modifications which fall within the scope and spirit of the invention and the invention is thus not limited to the embodiment expressly described above.

We claim:

1. A warning light for integration with a fixed position, externally mounted rear-view mirror of a vehicle, the vehicle having a front and a rear and a pair of lateral sides which extend between the front and rear, the rear-view mirror including a mirror adjustably supported within a non-adjustable mirror housing, the mirror housing having an open side through which the mirror may be viewed, the mirror housing open side including a rim portion which circumscribes a periphery of the mirror, the mirror housing open side generally facing in a same direction as the vehicle rear, said warning light comprising:

a hollow housing, said hollow housing having oppositely disposed leading and trailing ends interconnected by a side wall which defines a smooth outer surface, said hollow housing trailing end being sized and shaped to receive the mirror housing and form a radial extension of the mirror housing rim portion, said hollow housing defining an aerodynamically contoured forward extension of the received mirror housing, said hollow housing leading end having a smaller cross-section area compared to said hollow housing trailing end and being provided with a mounting surface, said hollow housing further having an opening which extends through said mounting surface;

a light head, said light head in part extending through said opening in said hollow housing mounting surface, said light head having a rearwardly facing surface which is complementary in size and shape to said mounting surface, said light head releasably secured to said mounting surface, said light head including:

a selectively energizable high intensity light source;

a reflector for intercepting and redirecting at least some light emitted by said light source, said reflector having a focal point and a generally concave reflective surface;

a lens for directing light emitted by said light source including light reflected from said reflector, said reflector and lens cooperating with said light source to produce a light beam which diverges in a horizontal plane, an angle of such divergence exceeding 90°; and means for supporting said light source between said lens and said reflector, said light source positioned by said supporting means to intersect said focal point; and means for adhesively bonding an interior of said side wall of said hollow housing to a exterior of the mirror housing such that light provided by said light head will be radiated generally in the direction of forward travel of the vehicle on which the mirror is mounted.

2. A warning light as recited in claim 1 wherein said hollow housing substantially envelopes the received mirror housing.

3. A warning light as recited in claim 2 wherein said means for adhesively bonding comprises a plurality of strips of double faced adhesive tape.

4. A warning light as recited in claim 1 wherein said means for adhesively bonding comprises a plurality of strips of double faced adhesive tape.

5. A method of manufacture of an integrated warning light and fixed position, externally mounted vehicle rear-view mirror assembly, the rear-view mirror assembly including a mirror adjustably supported within a non-adjustable mirror housing, the mirror housing having an open side through which the mirror may be viewed, the mirror housing open side including a rim portion which circumscribes a periphery of the mirror, said method comprising the steps of:

forming on the vehicle mirror assembly a model of a housing of a warning light subassembly, the formed model comprising a modelling material and being shaped to define a smooth walled forward projection of the mirror housing and which decreases in cross-sectional area in a direction away from the mirror housing open side;

incorporating a light head into the formed model such that pattern of light emitted thereby will be directed to maximize visibility of the vehicle, the model being adjusted to merge smoothly with the light head and to define a mounting surface complementary to a mounting surface on the light head;

removing the light head from the model and employing the model to make a casting having an interior shape and size commensurate with the model exterior shape and size;

producing a metal mold from the casting;

employing the metal mold to thermally form the warning light subassembly housing from plastic sheet material, the thermally formed housing having said defined mounting surface at a first smaller end thereof;

placing the thermally formed warning light subassembly housing over the mirror assembly such that the rim portion of the mirror housing and a second larger end of the formed warning light subassembly housing are coplanar;

adhesively bonding an exterior of the mirror assembly housing to the interior of a vacuum formed warning light subassembly housing; and mounting the light head to the mounting surface of the formed warning light subassembly housing.

6. A method for the manufacture of a housing of a high intensity warning light subassembly which is to be integrated with a fixed position, externally mounted rear-view mirror assembly of a vehicle, the rear-view mirror assembly including a mirror adjustably supported within a non-adjustable mirror housing, the mirror housing having an open side through which the mirror may be viewed, the mirror housing open side including a rim portion which circumscribes a periphery of the mirror, said method comprising the steps of:

forming on the rear-view mirror assembly of the vehicle a model which defines a housing of a warning light subassembly, the formed model comprising a modelling material and being shaped to define a smooth walled forward projection of the mirror housing and which decreases in cross-sectional area in a direction away from the mirror housing open side;

affixing a light head to the formed model and adjusting a position thereof such that pattern of light emitted thereby will be directed to maximize visibility of the vehicle;

varying the model such that its exterior surface merges smoothly with the light head in its final adjusted position, the model as varied defining a mounting surface complementary to a mounting surface on the light head;

removing the light head from the model and employing the model to make a casting having an interior shape and size commensurate with the model exterior shape and size; and producing a metal mold from the casting; and employing the metal mold to form the warning light subassembly housing from plastic sheet material, the formed warning light subassembly housing having a mounting surface, complimentary to the mounting surface on the light head, at a first smaller end thereof compared to a second larger end away from said first smaller end.

* * * * *

UNITED STATES PATENT AND TRADEMARK OFFICE
CERTIFICATE OF CORRECTION

PATENT NO. : 5,938,322
DATED : August 17, 1999
INVENTOR(S) : Alonzo, Jr. et al.

It is certified that error appears in the above-identified patent and that said Letters Patent is hereby corrected as shown below:

Claim 1, Column 5,
Line 41, delete "a" and repalce with -- an --.
Line 43, delete "the" and replace with -- a --.

Claim 5, Column 6,
Line 21, delete "assembly".
Line 22, delete "the" and replace with -- an --.
Line 22, delete "vacuum".

Signed and Sealed this

Twenty-first Day of August, 2001

*Attest:*

NICHOLAS P. GODICI
*Attesting Officer*   *Acting Director of the United States Patent and Trademark Office*